2,818,100

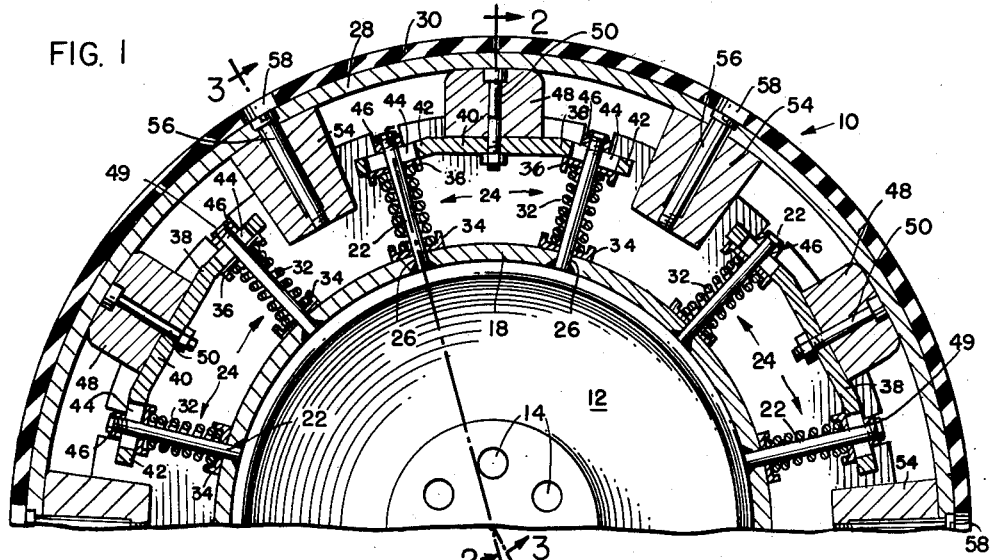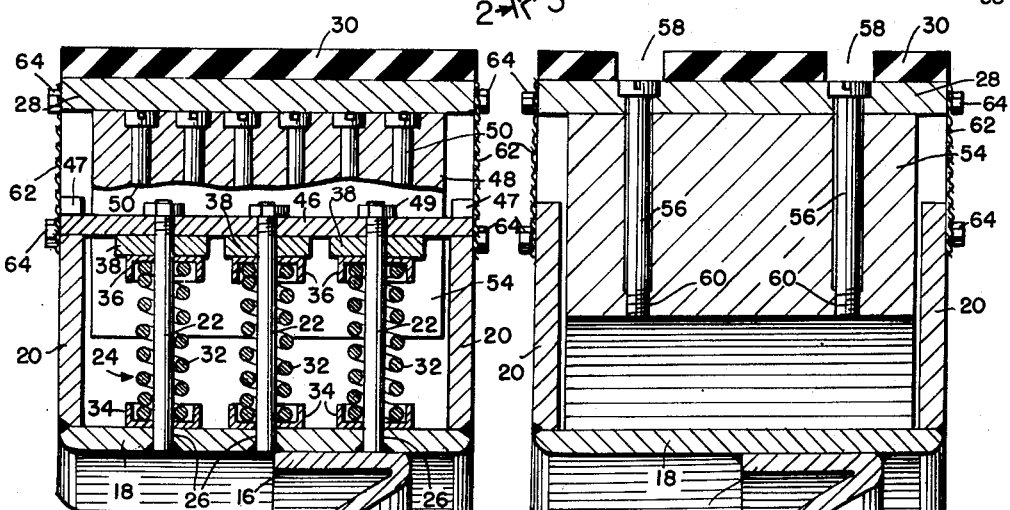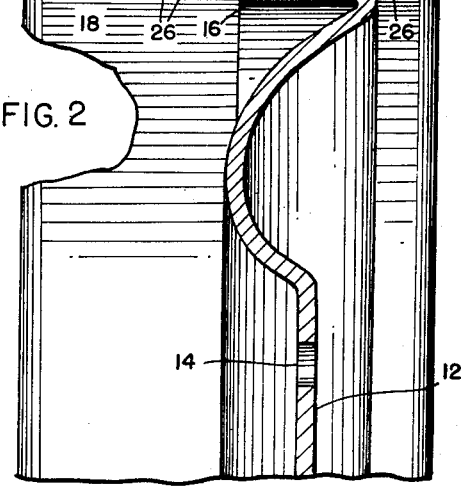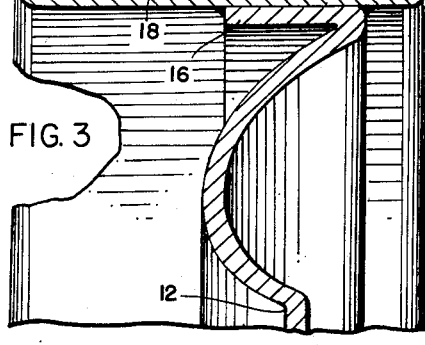

RESILIENT WHEEL

Christopher P. Coniglio, Oak Lawn, Ill.

Application March 5, 1956, Serial No. 569,425

9 Claims. (Cl. 152—109)

This application relates to resilient wheels for vehicles and more particularly to a resilient wheel for automobiles in which the need for pneumatic tires to cushion shocks and the running load is obviated and in which a plurality of compression springs are circumferentially arranged so that the load is evenly distributed and resiliently sustained throughout several of these springs at any particular moment.

A primary object of the invention is to provide a resilient wheel in which shocks are effectively absorbed mechanically while the loal at all times is fully supported.

Another object of the invention is to provide such a resilient wheel in which these springs are free to operate and yet rotary motion may be effectively transmitted to the outer rim or tire for propulsion of a vehicle.

Another object of the invention is to provide a resilient wheel in which the operative elements are shielded from contamination by road gravel and the like and which is characterized by ease of assembly and disassembly for repair of the load carrying and shock absorbing mechanism should that be necessary.

A further object of the invention is to provide an improved resilient wheel which exhibits convenience in form and improved functional characteristics and which obviates the dangers of puncture and blow-out which are inherent in wheels having pneumatic tires.

Other and further objects, advantages and features of the present invention will be apparent to those skilled in the art from the following description, taken in conjunction with the accompanying drawings in which similar reference characters relate to similar parts and in which:

Fig. 1 is a vertical sectional view, partly broken away, of a resilient wheel made in accordance with the present invention;

Fig. 2 is an elevational sectional view taken substantially on line 2—2 of Fig. 1; and Fig. 3 is a similar view on line 3—3 of Fig. 1.

Referring now to the drawings and more particularly to Fig. 1, the resilient wheel of the present invention, indicated generally by reference numeral 10, comprises essentially a mounting disc 12 having adjacent the center thereof circumferentially spaced openings 14 in which may be received the conventional lugs for mounting on the brake drum carried by the axle hub of an automobile. This disc 12 is arched or dished in the conventional manner to afford the maximum degree of strength and is provided at its outer edge with an oppositely extending flange 16. To the flange 16, or other peripheral formation on the disc, is secured, as by welding or the like, a cylindrical ring 18 to which are secured a plurality of radially extending circumferentially spaced suspension assemblies 24, which resiliently maintain a rim 28 in spaced concentric relation to the ring 18. The ring 18 is desirably channel-shaped in a cross-section, having radial flange-like side members, and may be formed integrally as by stamping or the like. In the present instance, however, it is shown as formed with the cylindrical member 18 forming the bottom wall of the channel, and a pair of radially extending flat rings 20, preferably welded to the ring 18 at its marginal edges, forming the side walls for the channel. A tire 30, of solid rubber or the like, is bonded to the outer surface of the rim 28 and it will be understood that this tire may have any desired tread configuration. It will also be understool that the channel ring may be integrally formed with the central disc portion if desired.

According to the present invention, the suspension assemblies 24 are arranged about the circumeference of the wheel to afford even distribution of shock stresses and the load of the vehicle. To this end, as best shown in Figs. 1 and 2, each assembly 24, of which there may be three or more depending upon size of wheel and load to be carried, includes a plurality of transversely spaced (as seen in Fig. 2) pairs of compression springs 32 each mounted in surrounding relation on a respective radial stud 22 received in openings 26 in the ring 18 and secured thereto preferably by welding. The inner ends of the springs 32 are received within retainer cups 34 mounted in surrounding relation to the studs 22 and normally bearing against the outer surface of the ring 18. The outer ends of the springs 32 are received within similar retaining cups 36 which are normally urged by the springs 32 into engagement with shock plates 38 which are mounted on and connect angularly aligned pairs of studs 22.

In the present instance, each assembly 24 comprises two angularly spaced groups or rows of three equally spaced studs 22 arranged transversely across the width of the ring 18 and each of the studs of one group is connected to a corresponding stud of the other group by means of a shock plate 38. As shown in Fig. 1, each plate 38 is formed with a straight center portion 40, and angularly disposed end portions 42 which are normal to the axes of the respective studs 22 and have longitudinally extending elongated slots 44 for reception of the outer ends of the studs 22 which hold the plates 38 by means of rigid brace bars 46 which extend transversely across the edges of the channel ring and are keyed thereto by being fitted into radial notches 47. The elongated slots 44 serve the further purpose of permitting necessary radial movement of the shock plates 38 on the studs 22, as will hereafter appear. The brace bars thus not only limit the outward movement of the shock plates 38 but also provide the angular driving connection between the suspension assembly and channel ring. Shallow nuts 49 secure the cross bars 46 to the studs 22. The several shock plates 38 are connected together transversely by means of a shock block 48 disposed medially of the shock plates and secured thereto by bolts 50. Thus, as shown, each assembly 24 consists of six studs 22, six springs 32, three shock plates 38, two cross braces or bars 46, and one shock block 48, all connected together to work as a unit both radially and angularly of the wheel axis.

Referring now to Fig. 2, it will be seen that running loads and road shocks are distributed to the several suspension assemblies by means of the shock blocks 48 which extend across the center portions 40 of the respective shock plates and as the wheel revolves the running load is progressively transferred from one assembly to another. The outer surfaces of the blocks 48 are merely in frictional engagement with the inner surface of the rim 28 and are provided with a plurality of countersunk openings for reception of the bolts 50. Thus when a load is placed on the solid tire 30 at a particular point, it is resiliently supported, through the medium of the blocks 48, by the shock plates 38 and springs 32 of the suspension assemblies 24. By this arrangement also, road shocks are precluded from the vehicle chassis by the compression of the springs 32. Preferably, however, the width of the rim 28 is made equal to or slightly greater than the outside width of the channel walls 20 so that any exceptional shock will only bring the rim into engagement with the channel walls and not cause breakage of the compression springs 32 and the studs 22.

For preventing lateral movement of the shock blocks 48 and their associated suspension assemblies 24 with relation to the rim 28, and for affording a driving connection between the disc 12 and the rim 28, a plurality of drive blocks 54 are secured to the inner surface of the rim 28 by means of laterally spaced bolts 56. As shown, the drive blocks 54 alternate with the suspension assemblies 24 and, as illustrated in Fig. 3, the blocks 54 are dimensioned to provide a sliding fit between the upstanding channel walls 20. Also, the blocks 54 are dimensioned to extend considerably below the level of the periphery of the channel walls 20, preferably a distance greater than the maximum possible radial displacement of the ring 28 relative to the wheel channel, and relative lateral movement of the rim 28 with respect to the remainder of the wheel is thus prevented.

Rotary motion is transmitted from the wheel disc 12 to the rim 28 through the shock plates 38 and cross braces 46. For example, upon rotation of the disc 12 in a clockwise direction, as viewed in Fig. 1, the radial studs 22 and brace bars 46 move angularly along with the ring 18. The studs 22 carry the shock plates 38 endwise into engagement with the drive blocks 54 and the rim 28 is thus positively rotated. Normally, there is a spacing of approximately one-half to three-quarters of an inch between the end edges of the shock plates 38 and the adjacent sides of the drive block 54, to permit radial movement of the rim 28 relative to the wheel, and in ordinary operation the frictional engagement of the shock blocks 48 on the inner surface of the rim 28 is sufficient for driving purpose. Under heavy load, however, the shock plates engage the drive blocks to drive the rim 28 and in such cases after the rotation of the wheel has been started, the elements tend to drift back to the position shown in Fig. 1.

In the event that disassembly of the wheel should be desired, openings 58 are formed in the solid rubber tire 30 for access to the bolts 56 which hold the drive blocks 54, the bolts 56 having engagement with threads 60 formed at the lower ends of the bolt passages. Once the blocks 54 have been loosened, they drop into the wheel channel where they are retained and the rim 28 may be easily slid off axially of the wheel and the several suspension assemblies 24 are exposed so that they may be serviced, should that be necessary.

For exclusion of road dirt, tar, gravel and the like from the assemblies 24, annular shields 62 may be secured by any suitable means, such as cap screws 64, to the side edges of the rim 28 and to the outer marginal edges of the channel rings 20. These rings or shields are preferably formed of any flexible material such as canvas impregnated with neoprene. However, it will be understood that if desired the shields 62 may be made of rigid material, and secured only to the rim 28, with the inner margins of the shields in sliding overlapping engagement with the outer surfaces of the channel walls 20.

It will be apparent that this invention may be embodied in devices which differ in many respects and details from the particular embodiment disclosed. All modifications which do not go beyond the scope of the invention will readily suggest themselves to those skilled in the art. It is, therefore, not intended that the invention be limited to the exact construction shown and described, but only to the inventive concept as defined in the appended claims.

I claim:

1. A resilient wheel comprising a channel-shaped ring opening radially outward relative to the ring axis, a plurality of resilient circumferentially spaced suspension assemblies secured to the bottom of said channel and acting radially outward therefrom, a rim radially supported for angularly slidable movement on said suspension assemblies and normally maintained thereby in spaced relation to said channel ring, a plurality of drive blocks secured to said rim and projecting radially inward between the walls of said channel ring between pairs of said suspension assemblies, and means on said assemblies for driving engagement with said drive blocks upon angular movement of said rim relative to said channel.

2. In a resilient wheel comprising a channel shaped ring opening radially outward relative to the ring axis, a plurality of resilient angularly spaced suspension assemblies mounted in said channel ring and projecting radially outward therefrom, and a rigid rim circumferentially surrounding said channel ring in radially spaced relation therewith and supported by said suspension assemblies, each of said suspension assemblies comprising a pair of angularly spaced studs projecting radially from the bottom of said channel ring and secured thereto, coiled compression springs surrounding said studs and bearing on the bottom of said channel, a shock plate extending angularly between said studs and slidably mounted for radial movement thereon to rest upon said coiled springs, and a shock block fixedly mounted on said shock plate transversely thereof and midway between said studs for radially engaging the inner surface of said rim.

3. In a resilient wheel comprising a channel shaped ring opening radially outward relative to the ring axis, a plurality of angularly spaced suspension assemblies mounted in said channel ring and projecting radially outward therefrom, and a rim circumferentially surrounding said channel ring in radially spaced relation therewith and supported by said suspension assemblies, each of said suspension assemblies comprising two angularly spaced rows of transversely paced studs secured to and projecting radially from the bottom of said channel ring, a coiled compression spring mounted on each of said studs in surrounding relation therewith, a shock plate extending between the corresponding studs of each row and slidable radially thereon, said shock plate being normally urged radially outward by the respective ones of said springs, means for limiting outward movement of said shock plate and a shock block mounted transversely on said shock plates and radially engaging the inner surface of said rim.

4. A resilient wheel comprising a channel-shaped ring opening radially outward, a plurality of circumferentially spaced suspension assemblies secured to said ring, a rim normally maintained in radially spaced relation to said ring by said suspension assemblies, each of said suspension assemblies including a plurality of transversely spaced pairs of angularly spaced radially extending compression springs, a plurality of studs secured to said ring one for guidance of each of said springs, a plate slidably mounted on and extending between each pair of said studs and supported by said springs, and a block interposed between said plates and said rim and connected to said plates transversely thereof for transmitting radial loads between said rim and said springs, and a plurality of angularly spaced drive blocks secured to said rim and extending radially inward therefrom in alternate relation with the several suspension assemblies.

5. A resilient wheel comprising a channel-shaped ring opening radially outward, a plurality of circumferentially spaced suspension assemblies secured to said ring, a rim normally maintained in radially spaced relation to said ring by said suspension assemblies, each of said suspension assemblies including a plurality of transversely spaced pairs of angularly spaced radially extending compression springs, a plurality of studs secured to said ring one for guidance of each of said springs, a plate slidably mounted on and extending between each pair of said studs and supported by said springs, transversely disposed cross braces keyed to opposite side margins of said channel ring for receiving and supporting the outer ends of said studs, and a block interposed between said plates and said rim and connected to said plates transversely thereof for transmitting radial loads between said rim and said springs, and a plurality of angularly spaced drive blocks secured to said rim and extending radially inward therefrom in alternate relation with the several suspension assemblies.

6. A resilient wheel comprising a channel-shaped ring having substantially parallel side walls and opening radially outward, a plurality of circumferentially spaced suspension assemblies secured to said ring between the walls thereof, a rim normally maintained in radially spaced concentric relation to said ring by said suspension assemblies, each of said suspension assemblies including a plurality of transversely spaced pairs of circumferentially spaced radially extending helically coiled compression springs, a plurality of studs secured to said ring and extending radially between the walls thereof, there being one stud extending axially through each of said springs, a plate slidably mounted on and extending between each pair of studs and resting on the respective springs, and a transversely extending block interposed between said plates and said rim and connected to said plates for transmitting radial loads between said rim and said springs, a plurality of drive blocks secured to said rim and projecting radially inward between the several suspension assemblies, and annular protective shields for said suspension assemblies secured to and extending between said rim and the peripheral margins of the walls of said ring.

7. A resilient wheel comprising a channel-shaped ring having substantially parallel side walls and opening radially outward, a plurality of circumferentially spaced suspension assemblies secured to said ring, a rim normally maintained in radially spaced relation to said ring by said suspension assemblies, each of said suspension assemblies including a plurality of transversely spaced pairs of circumferentially spaced radially extending coiled compression springs, a plurality of studs secured to said ring and each extending radially through a respective one of said springs, a plate slidably mounted on and extending between each pair of studs and supported by the respective springs, and a transversely disposed block interposed between said plates and said rim and connected to said plates for transmitting radial loads between said rim and said springs, and means for precluding relative transverse movement and for affording a positive drive relation between said ring and said rim, said last-named means including a plurality of drive blocks secured to the inner surface of said rim in circumferentially spaced relation and alternately with respect to suspension assemblies, said drive blocks being receivable in said ring for radial sliding motion between the walls thereof and engageable with the ends of the plates of a respective suspension assembly for effecting rotation of said rim.

8. A resilient wheel comprising a channel-shaped ring having substantially parallel side walls and opening radially outward, a plurality of circumferentially spaced suspension assemblies secured to said ring, a rim normally maintained in radially spaced relation to said ring by said suspension assemblies, each of said suspension assemblies including a plurality of transversely spaced pairs of circumferentially spaced radially extending coiled compression springs, a plurality of studs secured to said ring and each extending radially between said side walls through a respective one of said springs, a plate slidably mounted on and extending between each pair of studs and supported by the respective springs, transversely disposed cross braces keyed to the opposite margins of said side walls for receiving and supporting the outer ends of said studs, said cross braces being mounted outwardly of said plates, and a transversely disposed block interposed between said plates and said rim and connected to said plates for transmitting radial loads between said rim and said springs, and means for precluding relative transverse movement and for affording a positive drive relation between said ring and said rim, said last-named means including a plurality of drive blocks secured to the inner surface of said rim in circumferentially spaced relation and alternately with respect to said suspension assemblies, said drive blocks being receivable in said ring for radial sliding motion between the walls thereof and engageable with the ends of the plates of a respective suspension assembly for effecting rotation of said rim.

9. A resilient wheel comprising a channel-shaped ring having parallel side walls and opening radially outward, a plurality of circumferentially spaced suspension assemblies secured to said ring, a rim normally maintained in concentric spaced relation to said ring by said suspension assemblies; each of said suspension assemblies including a plurality of transversely spaced pairs of circumferentially spaced radially extending coiled compression springs, a plurality of studs secured to said ring and extending radially between the walls thereof, each of said studs extending axially through a respective one of said springs, a plate slidably mounted on and extending between each pair of studs and resting upon the respective springs, each of said plates including a main center portion and angularly disposed end portions having elongated longitudinally extending slots for reception of said studs, and a block interposed between said plates and said rim and secured to said plates transversely thereof for transmitting radial loads from said rim to said springs; and means for precluding relative transverse movement and for affording a positive drive relation between said ring and said rim, said last-named means including a plurality of drive blocks secured to the inner side of said rim in circumferentially spaced relation alternately with respect to said suspension assemblies, said drive blocks being receivable in said ring for sliding motion between the walls thereof and engageable with the ends of the plates of a respective suspension assembly for effecting driving rotation of said rim.

References Cited in the file of this patent
UNITED STATES PATENTS

| | | |
|---|---|---|
| 1,031,098 | Stock | July 2, 1912 |
| 1,143,982 | Meredith | June 22, 1915 |